(12) United States Patent
Liu

(10) Patent No.: US 12,166,215 B2
(45) Date of Patent: Dec. 10, 2024

(54) PACKAGING STRUCTURE AND BATTERY CELL

(71) Applicant: NINGDE AMPEREX TECHNOLOGY LIMITED, Ningde (CN)

(72) Inventor: Ying Liu, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 713 days.

(21) Appl. No.: 17/362,884

(22) Filed: Jun. 29, 2021

(65) Prior Publication Data

US 2021/0328288 A1 Oct. 21, 2021

Related U.S. Application Data

(63) Continuation of application No. PCT/CN2020/082122, filed on Mar. 30, 2020.

(51) Int. Cl.
*H01M 50/102* (2021.01)
*B32B 3/04* (2006.01)
(Continued)

(52) U.S. Cl.
CPC ............ *H01M 50/102* (2021.01); *B32B 3/04* (2013.01); *B32B 7/05* (2019.01); *H01M 50/124* (2021.01);
(Continued)

(58) Field of Classification Search
CPC ............ H01M 50/102; H01M 50/124; H01M 50/183; H01M 50/184; H01M 50/186; H01M 50/197; B32B 7/05; B32B 3/04
(Continued)

(56) References Cited

U.S. PATENT DOCUMENTS

2014/0072864 A1 3/2014 Suzuta et al.
2018/0241023 A1* 8/2018 Lim .................... H01M 50/178
(Continued)

FOREIGN PATENT DOCUMENTS

CN 202134624 U 2/2012
CN 202205821 U 4/2012
(Continued)

OTHER PUBLICATIONS

Ningde New Energy Technology Co., Ltd., Second Office Action, CN202080004294.9, Feb. 18, 2022, 21 pgs.
(Continued)

*Primary Examiner* — James M Erwin
*Assistant Examiner* — John S Medley
(74) *Attorney, Agent, or Firm* — Morgan, Lewis & Bockius LLP

(57) ABSTRACT

A packaging structure, including an accommodation portion and a sealing portion. The accommodation portion includes a first surface and a second surface. The first surface and the second surface are disposed opposite to each other in a thickness direction of the packaging structure. The sealing portion is disposed on a side of the accommodation portion, and the sealing portion is parallel to the first surface. The sealing portion protrudes outward from the side of the accommodation portion in a width direction of the packaging structure. In the packaging structure, the sealing portion is disposed parallel to the first surface, and the sealing portion protrudes outward from the side of the accommodation portion.

19 Claims, 16 Drawing Sheets

(51) Int. Cl.
*B32B 7/05* (2019.01)
*H01M 50/124* (2021.01)
*H01M 50/184* (2021.01)
*H01M 50/197* (2021.01)

(52) U.S. Cl.
CPC ....... *H01M 50/184* (2021.01); *H01M 50/197* (2021.01); *B32B 2457/10* (2013.01)

(58) Field of Classification Search
USPC ......................................................... 429/185
See application file for complete search history.

(56) References Cited

U.S. PATENT DOCUMENTS

| | | | | |
|---|---|---|---|---|
| 2020/0075992 | A1* | 3/2020 | Kandibanda | ........ H01M 50/186 |
| 2021/0043886 | A1* | 2/2021 | Oshima | ................ H01M 50/116 |

FOREIGN PATENT DOCUMENTS

| | | |
|---|---|---|
| CN | 203039036 U | 7/2013 |
| CN | 204067446 U | 12/2014 |
| CN | 105280955 A | 1/2016 |
| CN | 205122651 U | 3/2016 |
| CN | 205645897 U | 10/2016 |
| CN | 107567662 A | 1/2018 |
| CN | 207038562 U | 2/2018 |
| CN | 108054301 A | 5/2018 |
| CN | 108428814 A | 8/2018 |
| CN | 108574058 A | 9/2018 |
| CN | 109997242 A | 7/2019 |
| DE | 19901657 A1 | 7/1999 |
| EP | 3249715 A1 | 11/2017 |
| JP | H04319253 A | 11/1992 |
| JP | 2001084970 A | 3/2001 |
| JP | 2008041494 A | 2/2008 |
| JP | 2015079719 A | 4/2015 |
| JP | 2017118017 A | 6/2017 |
| JP | 2018506832 A | 3/2018 |
| WO | WO2009113634 A1 | 9/2009 |
| WO | WO2017177358 A1 | 10/2017 |
| WO | WO2019/194100 A1 | 10/2019 |
| WO | WO2019196073 A1 | 10/2019 |
| WO | WO2019203047 A1 | 10/2019 |

OTHER PUBLICATIONS

Ningde Amperex Technology Ltd., Extended European Search Report, EP20866946.5, Feb. 4, 2022, 8 pgs.
Ningde Amperex Technology Ltd., JP202155117, Notice of Reasons for Refusal, Mar. 3, 2023, 11 pgs.
Ningde Amperex Technology Ltd., JP2021515117, Notice of Reasons for Refusal, Jul. 12, 2022, 8 pgs.
Ningde Amperex Technology Ltd., CN202080004294.9, First Office Action, May 18, 2022, 19 pgs.
Ningde Amperex Technology Ltd., CN202080004294.9, Second Office Action, Aug. 3, 2022, 17 pgs.
Ningde Amperex Technology Ltd., CN202080004294.9, Third Office Action, Jan. 13, 2023, 14 pgs.
Office Action, CN202080004294.9, Nov. 12, 2021, 9 pgs.
International Search Report and Written Opinion, PCT/CN2020/082122, Dec. 29, 2020, 9 pgs.—No Translation Available.

* cited by examiner

PACKAGING STRUCTURE AND BATTERY CELL

CROSS REFERENCE TO THE RELATED APPLICATIONS

This application is a continuation of International Application No. PCT/CN2020/082122, filed on Mar. 30, 2020 and entitled "PACKAGING STRUCTURE AND BATTERY CELL", which is incorporated herein by reference in its entirety.

TECHNICAL FIELD

This application relates to the field of batteries, and in particular, to a packaging structure and a battery cell with the packaging structure.

BACKGROUND

In the manufacture of batteries, to prevent corrosion of a battery cell or a short circuit between the battery cell and an external device, trimmed edges of a package structure of the battery need to be sealed to avoid exposure of an aluminum layer. With miniaturization of portable electronic products such as a smart phone and a tablet computer, less space is available to the battery in the products, and development and use of ultra-thin battery cells have become a trend.

Currently, a packaging structure of the battery performs sealing by folding a sealing flap and affixing the sealing flap to a side of a to-be-packaged body. However, such a packaging structure is merely applicable to a battery cell that is thick to some extent, but not applicable to an ultra-thin battery cell. Therefore, how to package ultra-thin batteries has become an urgent problem to be solved.

SUMMARY

In view of the foregoing situation, it is necessary to provide a packaging structure that does not need to affix a sealing flap to a side of a to-be-packaged body. The packaging structure removes restriction on a thickness of a battery cell so as to be applicable to manufacturing of an ultra-thin battery cell. The application further discloses a battery cell with the packaging structure.

An embodiment of this application provides a packaging structure, including an accommodation portion and a sealing portion. The accommodation portion includes a first surface and a second surface. The first surface and the second surface are disposed opposite to each other in a thickness direction of the packaging structure. The sealing portion is disposed on a side of the accommodation portion, and the sealing portion is parallel to the first surface. The sealing portion protrudes outward from the side of the accommodation portion in a width direction of the packaging structure. The packaging structure further includes a seal, and the seal is disposed at an end of the sealing portion.

In an optional embodiment, the seal is an adhesive.

In an optional embodiment, the sealing portion includes a first folded layer and a second folded layer, the first folded layer and the second folded layer are parallel to the first surface. A first end of the first folded layer is connected to the side of the accommodation portion, and a second end of the first folded layer is connected to the second folded layer through a connecting portion.

Further, the first folded layer and the second folded layer are interspaced.

In an optional embodiment, a first seal is disposed between the side of the accommodation portion and an end of the second folded layer.

Further, a second seal is sandwiched between the first folded layer and the second folded layer.

In an optional embodiment, the first folded layer and the second folded layer are wrapped in a seal.

In an optional embodiment, a width of the first folded layer is greater than or equal to a width of the second folded layer in the width direction of the packaging structure.

In an optional embodiment, a thickness of the accommodation portion is less than 2 mm.

In an optional embodiment, the sealing portion is flush with the first surface, or the sealing portion is located between the first surface and the second surface.

In an optional embodiment, a thickness of the sealing portion is less than a thickness of the accommodation portion in the thickness direction of the packaging structure.

An embodiment of this application further discloses a battery cell, including an electrode assembly and any one of the packaging structures described above. The electrode assembly includes a first electrode plate, a second electrode plate, and a separator disposed between the first electrode plate and the second electrode plate. The electrode assembly is accommodated in the accommodation portion of the packaging structure.

Further, the battery cell further includes a tab, the tab is connected to the first electrode plate, and the tab extends out of a first end of the accommodation portion in a length direction of the packaging structure.

In the packaging structure, the sealing portion is disposed parallel to the first surface, and the sealing portion protrudes outward from the side of the accommodation portion. Therefore, a sealing flap is not necessarily affixed to a side of a to-be-packaged body, and the packaging structure removes restriction on a thickness of the battery cell and is applicable to manufacturing of an ultra-thin battery cell.

REFERENCE NUMERALS

Figure 1:
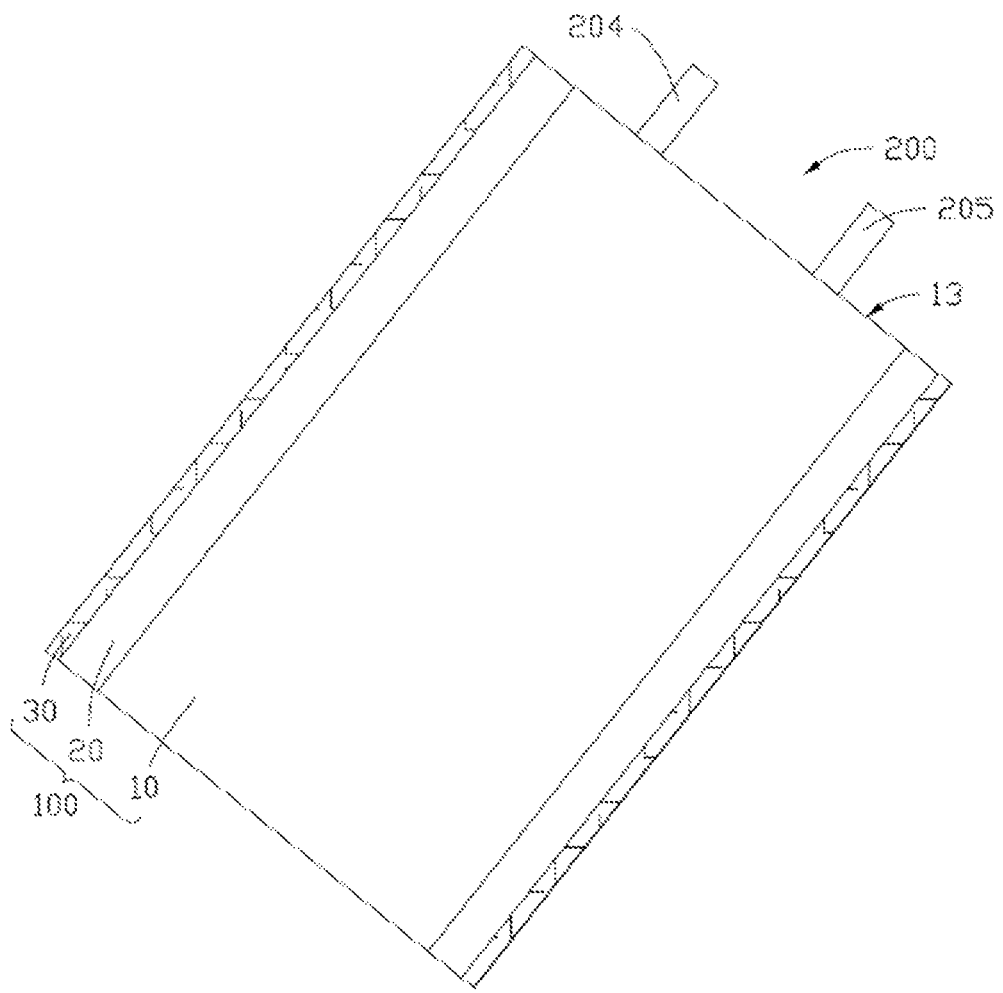
FIG. 1 is a schematic structural diagram of a packaging structure and a battery cell according to a first embodiment.

Packaging structure 100
Accommodation portion 10
First surface 11
Second surface 12
First end 13
Sealing portion 20
First folded layer 21
First end 211
Second end 212
Second folded layer 22
Connecting portion 23
Seal 30
First seal 31
Second seal 32
Battery cell 200
First electrode plate 201
Second electrode plate 202
Separator 203
Tabs 204, 205

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. All other embodiments derived by a person of ordinary skill in the art based on the embodiments of this application without making any creative efforts shall fall within the protection scope of this application.

It needs to be noted that an element referred to as being "fixed to" another element may directly exist on the other element or may be fixed to the other element through an intermediate element. An element considered to be "connected to" another element may be directly connected to the other element or may be connected to the other element through an intermediate element. An element considered to be "disposed on" another element may be directly disposed on the other element or may be disposed on the other element through an intermediate element. The terms "vertical", "horizontal", "left", "right" and similar expressions used herein are merely for ease of description.

Unless otherwise defined, all technical and scientific terms used herein have the same meanings as usually understood by a person skilled in the technical field of this application. The terms used in the specification of this application herein are merely intended for describing specific embodiments but are not intended to limit this application. The term "and/or" used herein is intended to include any and all combinations of one or more related items preceding and following the term.

An embodiment of this application provides a packaging structure, including an accommodation portion and a sealing portion. The accommodation portion includes a first surface and a second surface. The first surface and the second surface are disposed opposite to each other in a thickness direction of the packaging structure. The sealing portion is disposed on a side of the accommodation portion, and the sealing portion is parallel to the first surface. The sealing portion protrudes outward from the side of the accommodation portion in a width direction of the packaging structure.

In the packaging structure, the sealing portion is disposed parallel to the first surface, and the sealing portion protrudes outward from the side of the accommodation portion. Therefore, a sealing flap is not necessarily affixed to a side of a to-be-packaged body, and the packaging structure removes restriction on a thickness of the battery cell and is applicable to manufacturing of an ultra-thin battery cell.

The following describes some embodiments of this application in detail. To the extent that no conflict occurs, the following embodiments and the features in the embodiments may be combined with each other.

First Embodiment

Figure 2:
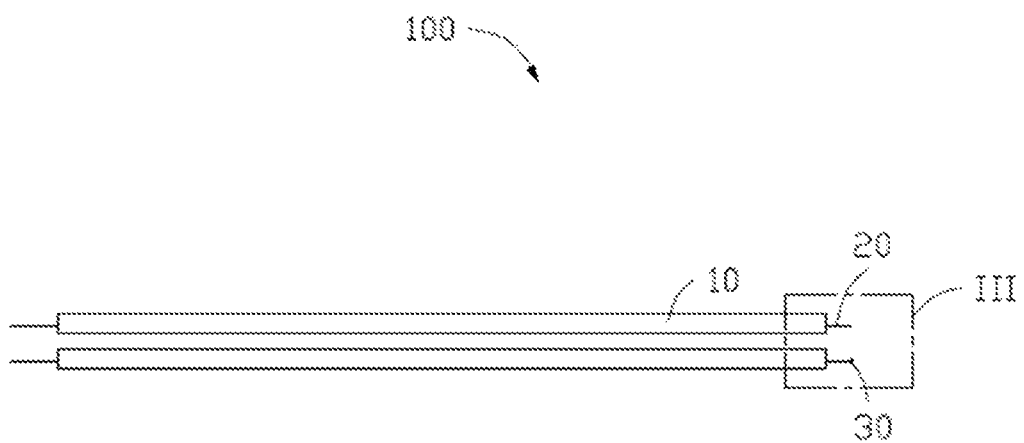
FIG. 2 is a bottom view of the packaging structure shown in FIG. 1 and shows an edge sealing process.
Figure 3:
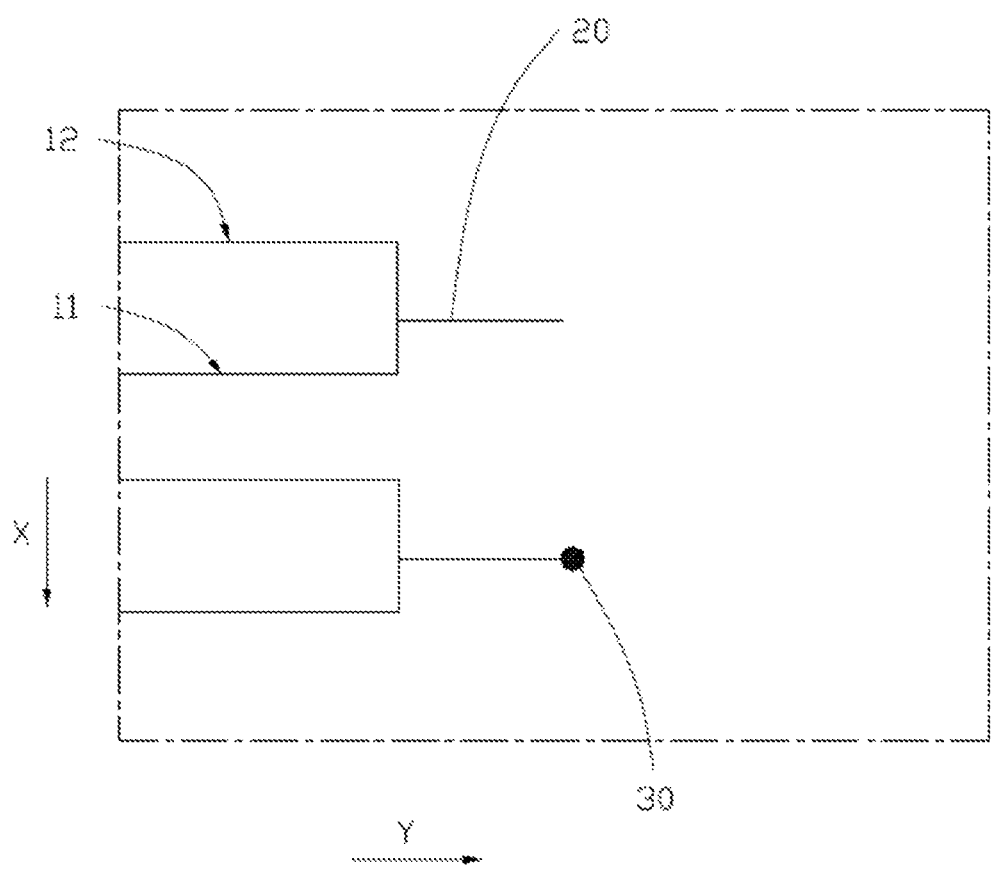
FIG. 3 is a local detailed view of FIG. 2.

Referring to FIG. 1, FIG. 2, and FIG. 3, in a first embodiment, a packaging structure 100 includes an accommodation portion 10 and a sealing portion 20. The accommodation portion 10 includes a first surface 11 and a second surface 12. The first surface 11 and the second surface 12 are disposed opposite to each other in a thickness direction (a direction indicated by an arrow X in FIG. 3) of the packaging structure 100. The sealing portion 20 is disposed on a side of the accommodation portion 10, and the sealing portion 20 is parallel to the first surface 11. The sealing portion 20 protrudes outward from the side of the accommodation portion 10 in a width direction (a direction indicated by an arrow Y in FIG. 3) of the packaging structure 100.

Further, the sealing portion 20 is approximately perpendicular to the side of the accommodation portion 10. A thickness of the sealing portion 20 is less than a thickness of the accommodation portion 10 in the thickness direction of the packaging structure 100. The packaging structure 100 further includes a seal 30. The seal 30 is disposed at an end of the sealing portion 20. In the first embodiment, the seal 30 is an adhesive, and preferably a photosensitive adhesive. A main ingredient of the adhesive is esters that are highly sticky and free of side reactions, for example, epoxy resin, and polyurethane. Under an effect of ultraviolet light, the photosensitive adhesive can be cure quickly to achieve a target strength. The seal 30 may be dispensed or plastered or disposed by other means at the end of the sealing portion 20. Further, epoxy groups in the photosensitive adhesive may cause the photosensitive adhesive to undergo a crosslinking reaction with various curing agents to form an insoluble and infusible superpolymer that has a three-way meshed structure. The superpolymer is highly stable. Therefore, the photosensitive adhesive serving as the seal 30 has relatively high anti-aging performance, and is resistant to high temperatures and corrosion, and the packaging structure 100 is more stable and is applicable to protecting the side of the battery cell 200. In other embodiments, the seal 30 may be other types of quick curing binders. This application is not limited thereto.

In an edge sealing process, the sealing portion 20 is pressed snugly first, and edges are trimmed finely. A width of a trimmed edge is less than 2 mm. That is, the width of the sealing portion 20 is less than 2 mm. The seal 30 is disposed at the end of the finely trimmed sealing portion 20, and a cylindrical-like long strip whose cross section is roughly circular is formed. The end of the sealing portion 20 is wrapped in the seal 30, so as to prevent exposure of an aluminum edge of the battery cell 200 and prevent corrosion and short-circuits of the battery cell 200. A radius of the cross section of the formed seal 30 is 0.01~0.03 mm. A sum of the width of the sealing portion 20 and the width of the seal 30 is less than the thickness of the accommodation portion 10. To meet requirements on the size of an ultra-thin battery cell, the thickness of the accommodation portion 10 is less than 2 mm. Further, a length-width-thickness ratio of the accommodation portion 10 is (10~250):(10~250):(0.3~2.0). Specifically, preferably, the accommodation portion 10 is 40 mm~160 mm in length, 20 mm~230 mm in width, and 1.0 mm~2.0 mm in thickness.

The sealing portion 20 is disposed in parallel with the first surface 11 of the accommodation portion 10. That is equivalent to disposing the sealing portion 20 in parallel with a main body of the battery cell 200 to enlarge a buffer region of the battery cell 200, thereby effectively improving safety performance of the battery cell 200 whose corner strikes the ground when dropping.

Figure 18:
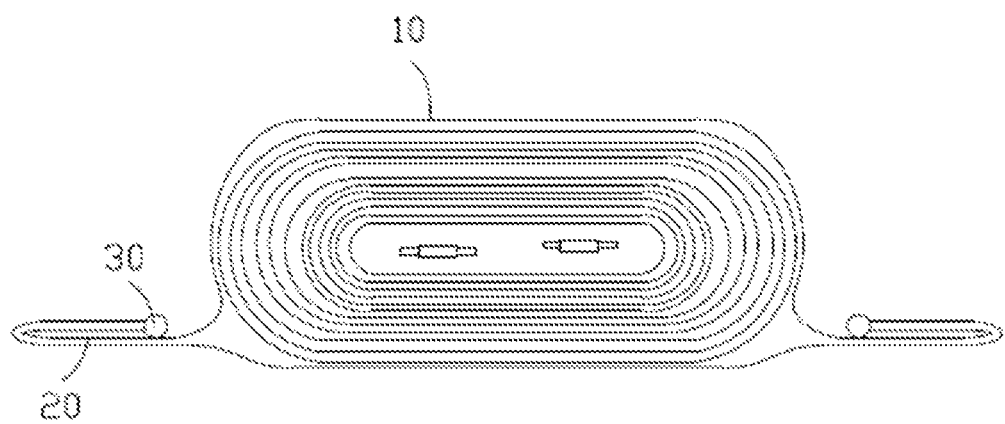
FIG. 18 is a schematic structural diagram of a packaging structure according to another extended embodiment.
Figure 19:
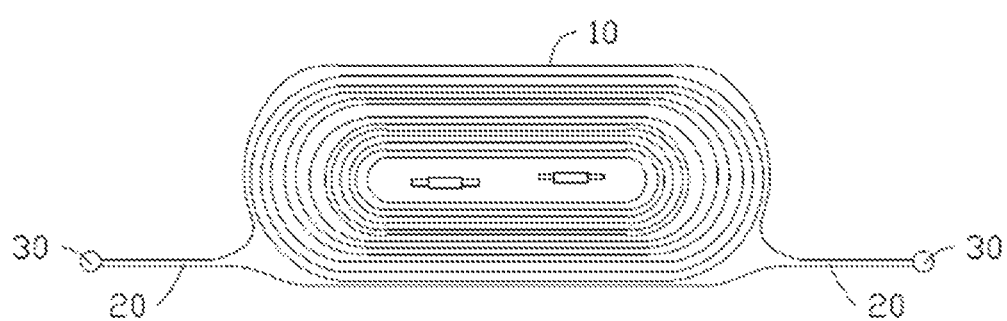
FIG. 19 is a schematic structural diagram of a packaging structure according to another extended embodiment.

In the first embodiment, two sealing portions 20 are symmetrically distributed on two sides of the accommodation portion 10 in the width direction of the packaging structure. The sealing portion 20 is located between the first surface 11 and the second surface 12. Referring to FIG. 18 and FIG. 19, in other extended embodiments, the sealing portion 20 is flush with the first surface 11. The packaging structure 100 may be a package that wraps an outer surface of the battery cell 200. The sealing portion 20 extends outward from the side of the accommodation portion 10, and the seal 30 wraps a notch at the end of the sealing portion 20. The sealing portion 20 may be further folded so that the seal 30 is close to the side of the accommodation portion 10. The sealing portion 20 as a whole still remains parallel to the accommodation portion 10, thereby reducing the width of the sealing portion 20 but without making the thickness of the sealing portion 20 exceed the thickness of the accommodation portion 10.

Second Embodiment

Figure 4:
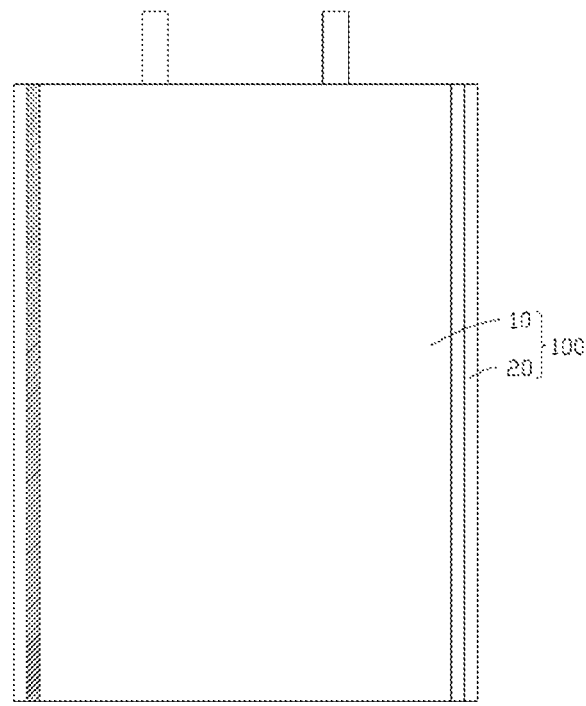
FIG. 4 is a schematic structural diagram of a packaging structure and a battery cell according to a second embodiment.
Figure 5:
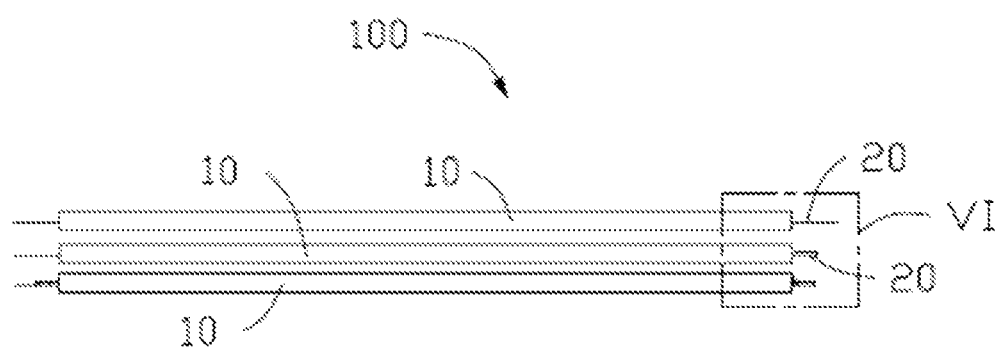
FIG. 5 is a bottom view of the packaging structure shown in FIG. 1 and shows an edge sealing process.
Figure 6:
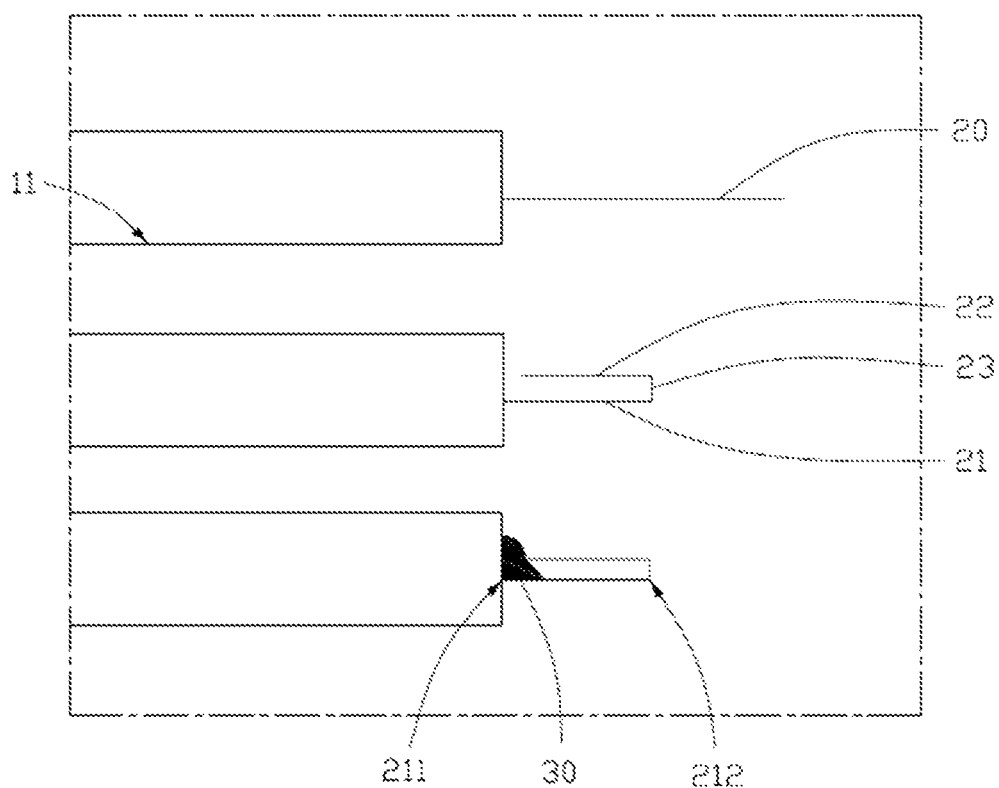
FIG. 6 is a local detailed view of FIG. 5.

Referring to FIG. 4, FIG. 5, and FIG. 6, the packaging structure 100 in a second embodiment is almost identical to that in the first embodiment, but differs in that the sealing portion 20 includes a first folded layer 21 and a second folded layer 22 that are parallel to the first surface 11. A first end 211 of the first folded layer 21 is connected to the side of the accommodation portion 10. A second end 212 of the first folded layer 21 is connected to the second folded layer 22 through a connecting portion 23. The first folded layer 21 and the second folded layer 22 are formed by folding the finely trimmed sealing portion 20 at 180°. Both the first folded layer 21 and the second folded layer 22 are approximately perpendicular to the side of the accommodation portion 10.

Further, the first folded layer 21 and the second folded layer 22 are parallel and interspaced. In the second embodiment, the seal 30 is disposed between the accommodation portion 10 and the second folded layer 22 to ensure stickiness between the accommodation portion 10 and the second folded layer 22 and to seal the packaging structure 100. In the second embodiment, the cross section of the seal 30 is approximately in a semicircular fluid distribution form, and can simultaneously bond the first end of the first folded layer 21 and the end of the second folded layer 22. In other embodiments, the cross section of the seal 30 may be in other forms. This application is not limited thereto.

Third Embodiment

Figure 7:
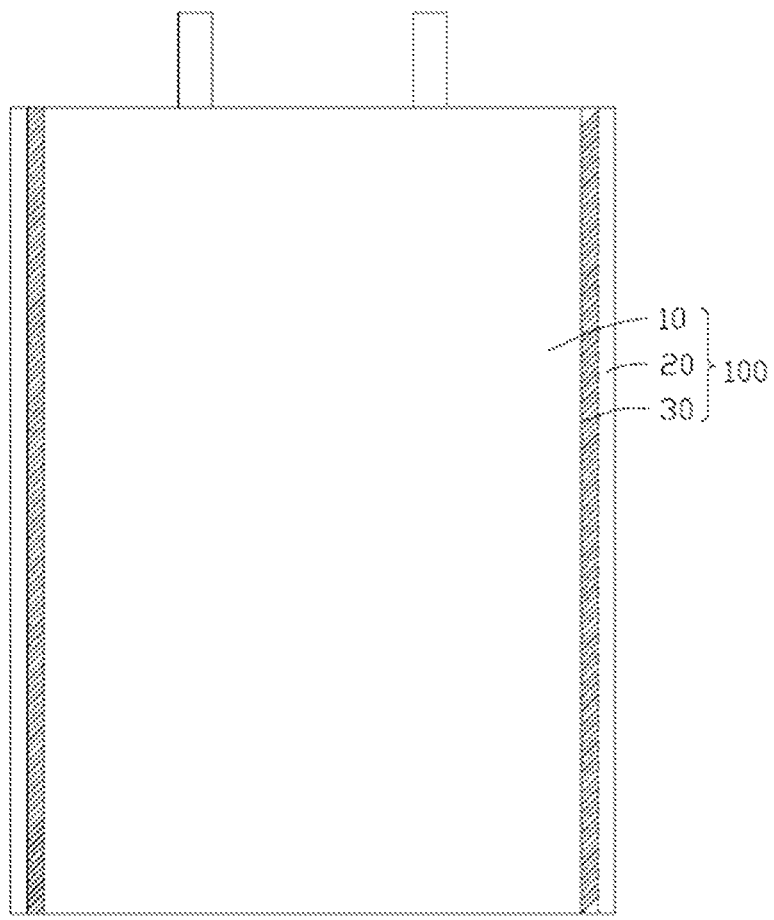
FIG. 7 is a schematic structural diagram of a packaging structure and a battery cell according to a third embodiment.
Figure 8:
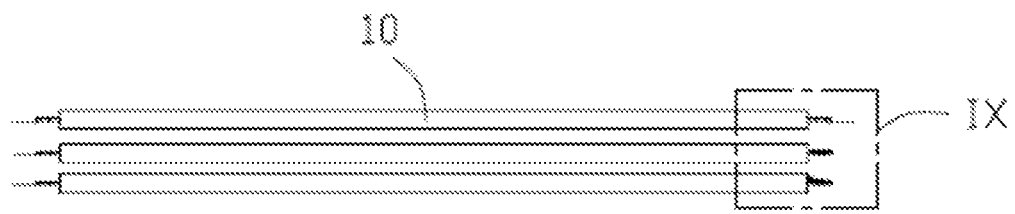
FIG. 8 is a bottom view of the packaging structure shown in FIG. 7 and shows an edge sealing process.
Figure 9:
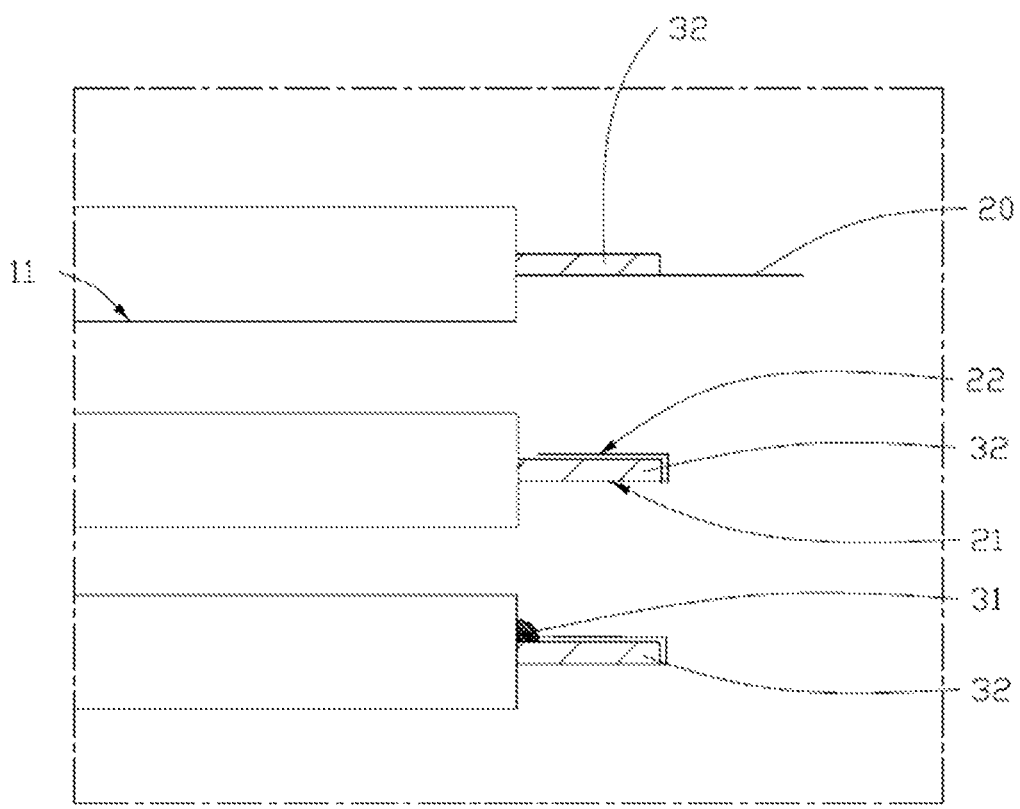
FIG. 9 is a local detailed view of FIG. 8.

Referring to FIG. 7, FIG. 8, and FIG. 9, a packaging structure 100 in a third embodiment is almost identical to that in the second embodiment, but differs in: in the third embodiment, the seal 30 includes a first seal 31 and a second seal 32. The first seal 31 is disposed between the side of the accommodation portion 10 and the end of the second folded layer 22, and the second seal 32 is sandwiched between the first folded layer 21 and the second folded layer 22. In this embodiment, preferably, the first seal 31 is a photosensitive adhesive, and the second seal 32 is a hot-melt adhesive. The second seal 32 is applied and extending outward from the side of the accommodation portion 10, and the second seal 32 is configured to bond and fix the first folded layer 21 and the second folded layer 22. The first seal 31 is configured to bond the accommodation portion 10 and the second folded layer 22 to prevent the sealing portion 20 from stretching open, and also to seal the finely trimmed edges and prevent the aluminum layer from being exposed and corroded.

The cross section of the first seal 31 is approximately fan-shaped. The thickness of the second seal 32 is 1 mm±0.3 mm, and the width of the second seal is ⅓~½ of the width of the unfolded sealing portion 20. Further, the sum of thicknesses of the first seal 31, the second seal 32, the first folded layer 21, and the second folded layer 22 is less than the thickness of the accommodation portion 10.

Further, the first seal 31 is disposed in a fully plastering manner, and the first seal 31 is disposed on the side of the entire accommodation portion 10. The second seal 32 may be dispensed or fully plastered at an end of the sealing portion 20, the end being connected to the accommodation portion 10, so as to bond the first folded layer 21 and the second folded layer 22.

Fourth Embodiment

Figure 10:
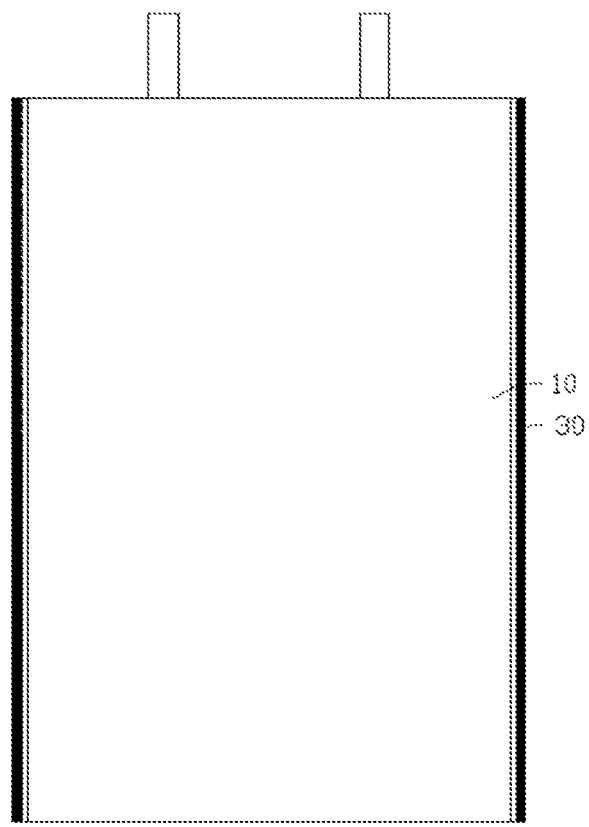
FIG. 10 is a schematic structural diagram of a packaging structure and a battery cell according to a fourth embodiment.
Figure 11:
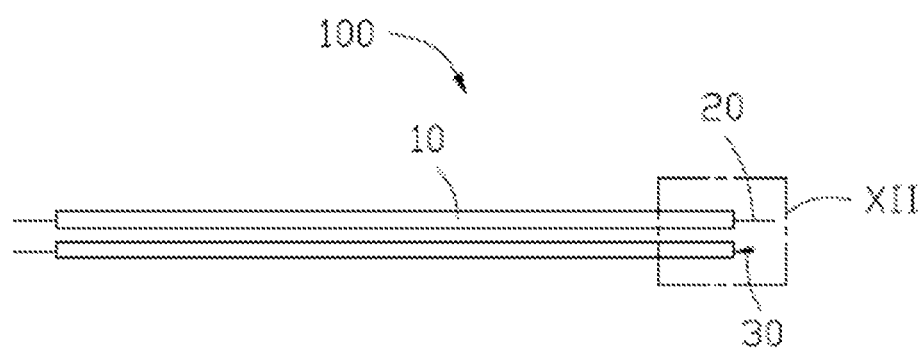
FIG. 11 is a bottom view of the packaging structure shown in FIG. 10 and shows an edge sealing process.
Figure 12:
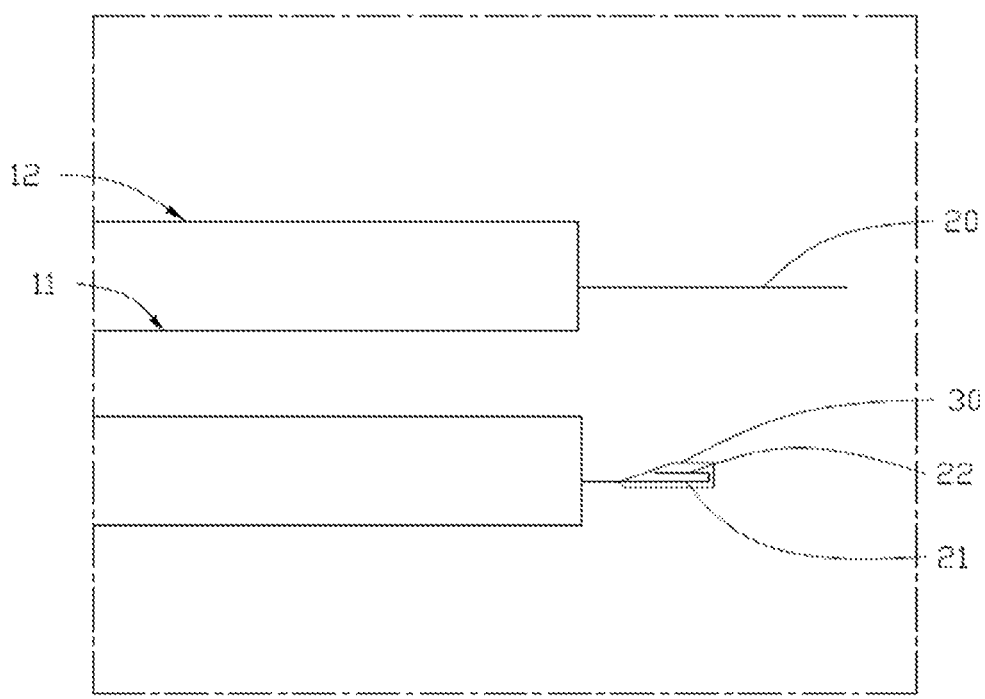
FIG. 12 is a local detailed view of FIG. 11.

Referring to FIG. 10, FIG. 11, and FIG. 12, a packaging structure 100 in a fourth embodiment is almost identical to that in the second embodiment, but differs in: in the fourth embodiment, the first folded layer 21 and the second folded layer 22 are wrapped in the seal 30. The seal 30 is made of a material such as adhesive paper and adhesive tape, and overlays the first folded layer 21 and the second folded layer 22 of the sealing portion 20 by winding or wrapping.

Further, a width of the first folded layer 21 is greater than or equal to a width of the second folded layer 22 in the width direction of the packaging structure 100. Specifically, the width of the second folded layer 22 is ⅓~½ of the width of the first folded layer 21. There is no gap between the seal 30 and the first folded layer 21 or the second folded layer 22. That is, the seal 30 fits closely with an outer side of the sealing portion 20, thereby helping to protect the connecting portion 23 of the sealing portion 20 and make the sealing portion 20 more resistant to abrasion. In an embodiment, the width of the seal 30 needs to be greater than twice the width of the second folded layer 22. That is, the seal 30 is located below the first folded layer 21 and above the second folded layer 22 concurrently. An adhesive force of the seal 30 needs to be greater than a tensile force of stretching the sealing portion 20, so as to ensure that the seal 30 can sufficiently restrain the sealing portion 20 and prevent the sealing portion 20 from stretching open. The length of the seal 30 is identical to the length of the sealing portion 20. That is, the seal 30 overlays the side of the entire accommodation portion 10.

Figure 13:
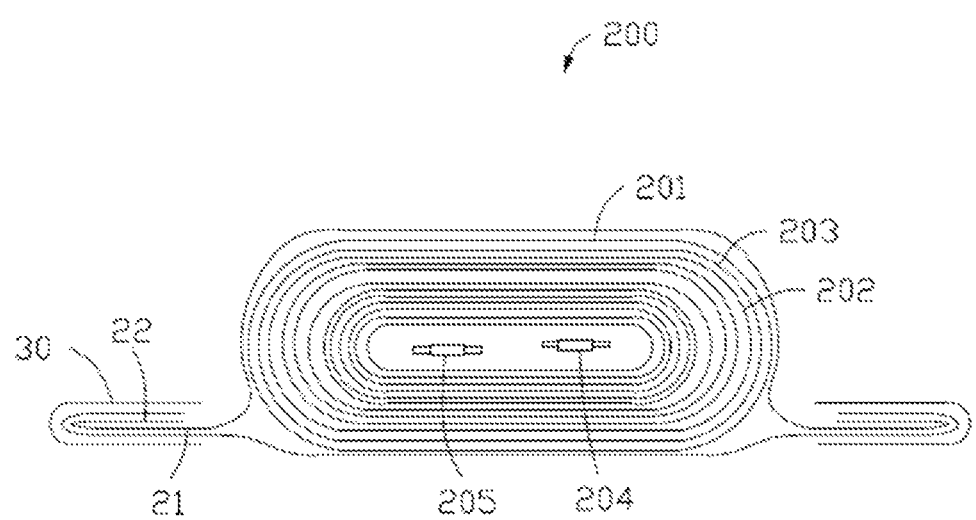
FIG. 13 is a schematic structural diagram of the packaging structure shown in FIG. 10 according to an extended embodiment.

Referring to FIG. 13, in an expanded embodiment, the battery cell 200 may be a battery cell that has a jelly-roll structure, and is disposed in the accommodation portion 10. The sealing portion 20 is folded at 180° after edges are trimmed finely. The seal 30 wraps the entire sealing portion 20 and a notch of the sealing portion 20 to complete the packaging process.

Fifth Embodiment

Figure 14:
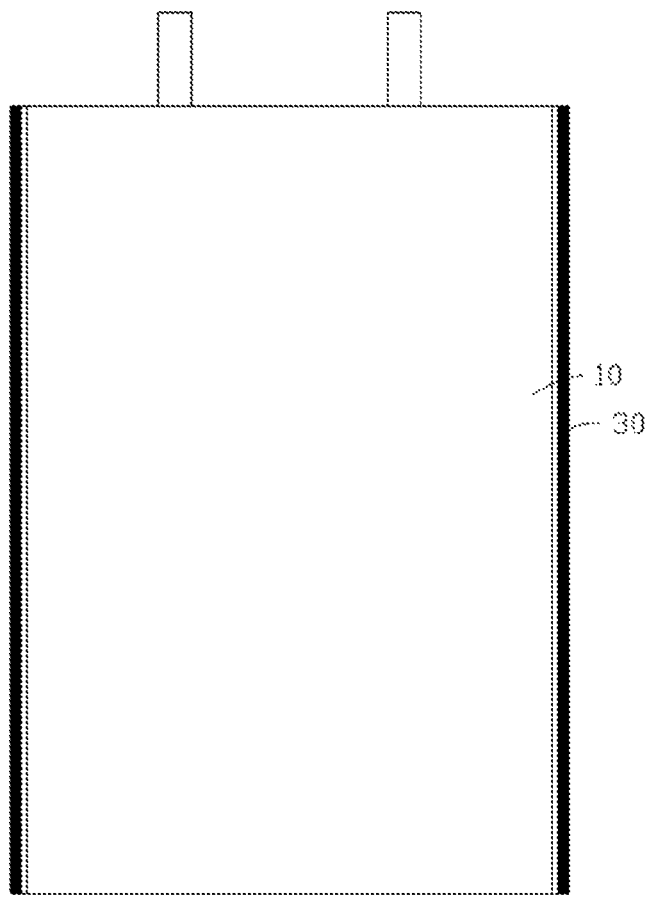
FIG. 14 is a schematic structural diagram of a packaging structure and a battery cell according to a fifth embodiment.
Figure 15:
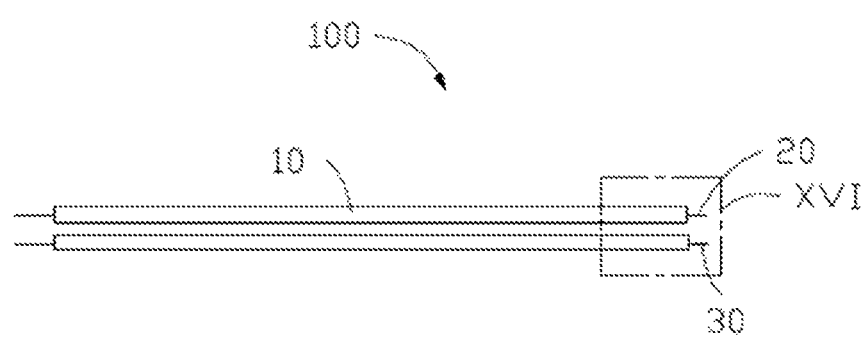
FIG. 15 is a bottom view of the packaging structure shown in FIG. 14 and shows an edge sealing process.
Figure 16:
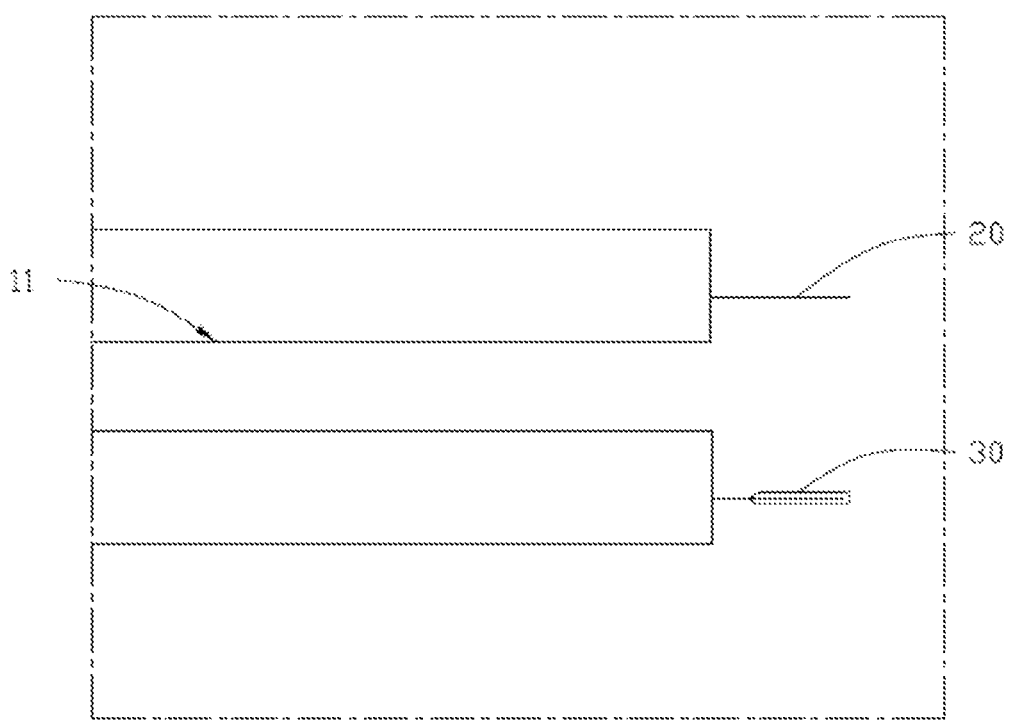
FIG. 16 is a local detailed view of FIG. 15.

Referring to FIG. 14, FIG. 15, and FIG. 16, a packaging structure 100 in a fifth embodiment is almost identical to that in the first embodiment, but differs in: in the fifth embodiment, the seal 30 is made of a material such as adhesive paper or adhesive tape. The seal 30 is affixed to an upper surface and a lower surface of the sealing portion 20, and wraps an end of the notch of the sealing portion 20. Further, the width of the seal 30 is at least a half of the width of the sealing portion 20.

Figure 17:
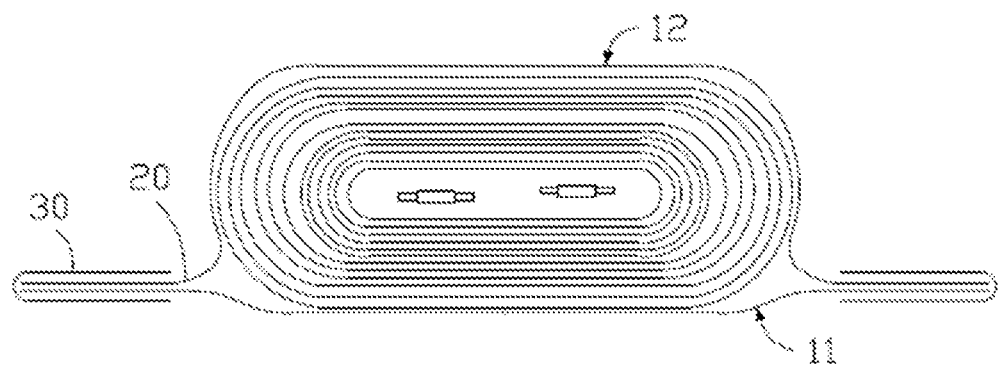
FIG. 17 is a schematic structural diagram of the packaging structure shown in FIG. 14 according to an extended embodiment.

Referring to FIG. 17, in an expanded embodiment, the notch end and the upper and lower sides of the sealing portion 20 are wrapped by the seal 30, so that the side of the packaging structure 100 is much more airtight and much more resistant to abrasion. Because no bending process is performed, the sealing portion 20 is free from the risk of stretching the folded edge open, thereby increasing stability of the sealing portion 20 to some extent.

This application further provides a battery cell 200, including an electrode assembly and the packaging structure 100 disclosed in any one of or any combination of the foregoing embodiments. The electrode assembly includes a first electrode plate 201, a second electrode plate 202, and a separator 203 disposed between the first electrode plate 201 and the second electrode plate 202. A polarity of the first electrode plate 201 is opposite to that of the second electrode plate 202. The electrode assembly is formed by winding the first electrode plate 201, the separator 203, and the second electrode plate 202. The electrode assembly is accommodated in the accommodation portion 10 of the packaging structure 100. The battery cell 200 further includes a tab 204. The tab 204 is connected to the first electrode plate 201. The tab 204 extends out of a first end 13 of the accommodation portion 10 in a length direction of the packaging structure 100. The battery cell 200 may further include another tab 205 of an opposite polarity, configured to connect to the second electrode plate 202. The tab 205 also extends out of the accommodation portion 10.

Comparative Embodiment

Figure 20:
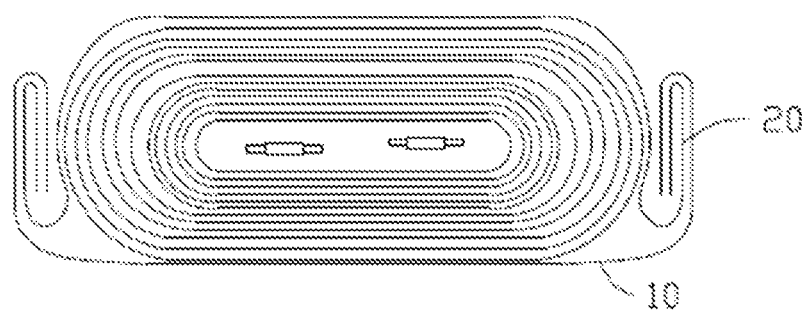
FIG. 20 is a schematic structural diagram of a packaging structure according to a comparative embodiment.

Referring to FIG. 20, in a comparative embodiment, an implementation of a packaging structure is similar to that in the second embodiment, but differs in: the sealing portion 20 in the comparative embodiment is further folded at 90° after being folded at 180°. In this way, the sealing portion 20 is affixed to the side of the accommodation portion 10, and the sealing portion 20 is approximately perpendicular to the first surface 11 of the accommodation portion 10.

The packaging structure in the comparative embodiment needs to be folded twice. This increases difficulty of a manufacturing process and requires a high precision of equipment. In addition, due to limitations in the prior art, the packaging structure in the comparative embodiment is applicable to a battery cell whose thickness is greater than 2.3 mm, but not applicable to an ultra-thin battery cell whose thickness is less than 2 mm. Further, because the sealing portion 20 is affixed to the side of the accommodation portion 10, the sealing portion 20 is smaller in width and is unable to serve a buffering function, thereby increasing risks of damaging the battery cell in a case of dropping.

In another comparative embodiment, the sealing portion 20 may be directly folded at 90° to the side of the accommodation portion 10 without being folded at 180°, and then adhesive paper wraps the entire sealing portion 20 and is affixed onto the upper and lower surfaces of the accommodation portion 10. In this case, the adhesive paper increases the overall thickness of the battery cell, thereby being not conducive to manufacturing of an ultra-thin battery cell.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and scope of the technical solutions of this application.

What is claimed is:

1. A packaging structure, comprising:
an accommodation portion; and
a sealing portion; wherein,
the accommodation portion comprises a first surface and a second surface, and the first surface and the second surface are disposed opposite to each other in a thickness direction of the packaging structure;
the sealing portion is disposed on a side of the accommodation portion;
the sealing portion includes a first end adjacent to the side of the accommodation portion and a second end opposite to the first end; the sealing portion protrudes outward from the side of the accommodation portion from the first end and extends away from the accommodation portion towards the second end in a width direction of the packaging structure;
the sealing portion comprises a first folded layer and a second folded layer; the first folded layer extends from the first end towards the second end and the second folded layer extends from the second end towards the accommodation portion, wherein the first folded layer and the second folded layer are connected by a connecting portion at the second end of the sealing portion; and
the packaging structure further comprises a seal, wherein the seal is disposed at the second end of the sealing portion.

2. The packaging structure according to claim 1, wherein the seal is an adhesive.

3. The packaging structure according to claim 1, wherein the first folded layer and the second folded layer are interspaced.

4. The packaging structure according to claim 1, wherein a first seal is disposed between the side of the accommodation portion and an end of the second folded layer.

5. The packaging structure according to claim 4, wherein a second seal is sandwiched between the first folded layer and the second folded layer.

6. The packaging structure according to claim 1, wherein the first folded layer and the second folded layer are wrapped in the seal.

7. The packaging structure according to claim 1, wherein a width of the first folded layer is greater than or equal to a width of the second folded layer in the width direction of the packaging structure.

8. The packaging structure according to claim 1, wherein a thickness of the accommodation portion is less than 2 mm.

9. The packaging structure according to claim 1, wherein the sealing portion is flush with the first surface, or the sealing portion is located between the first surface and the second surface.

10. The packaging structure according to claim 1, wherein a length-width-thickness ratio of the accommodation portion is (10~250):(10~250):(0.3~2.0).

11. The packaging structure according to claim 1, wherein a thickness of the sealing portion is less than a thickness of the accommodation portion in the thickness direction of the packaging structure.

12. A battery cell, comprising:
an electrode assembly comprising a first electrode plate, a second electrode plate, and a separator disposed between the first electrode plate and the second electrode plate; and
a packaging structure, wherein the packaging structure comprises:
an accommodation portion, wherein:
the accommodation portion comprises a first surface and a second surface, and the first surface and the second surface are disposed opposite to each other in a thickness direction of the packaging structure, the electrode assembly is accommodated in the accommodation portion of the packaging structure; and
a sealing portion, wherein:
the sealing portion is disposed on a side of the accommodation portion;
the sealing portion includes a first end adjacent to the side of the accommodation portion and a second end opposite to the first end; the sealing portion protrudes outward from the side of the accommodation portion from the first end and extends away from the accommodation portion towards the second end in a width direction of the packaging structure;
the sealing portion comprises a first folded layer and a second folded layer: the first folded layer extends from the first end towards the second end and the second folded layer extends from the second end towards the accommodation portion, wherein the first folded layer and the second folded layer are connected by a connecting portion at the second end of the sealing portion; and
the packaging structure further comprises a seal, wherein the seal is disposed at the second end of the sealing portion.

13. The battery cell according to claim 12, wherein the seal is an adhesive.

14. The battery cell according to claim 12, wherein the first folded layer and the second folded layer are interspaced.

15. The battery cell according to claim 12, wherein a first seal is disposed between the side of the accommodation portion and an end of the second folded layer.

16. The battery cell according to claim 15, wherein a second seal is sandwiched between the first folded layer and the second folded layer.

17. The battery cell according to claim 12, wherein the first folded layer and the second folded layer are wrapped in the seal.

18. The battery cell according to claim 12, further comprising a tab, the tab is connected to the first electrode plate, and the tab extends out of a first end of the accommodation portion in a length direction of the packaging structure.

19. The packaging structure according to claim 1, wherein the first folded layer and the second folded layer are parallel to the first surface.

* * * * *